(12) United States Patent
Braykoff et al.

(10) Patent No.: US 10,913,351 B2
(45) Date of Patent: Feb. 9, 2021

(54) AXLE DRIVE SYSTEM

(71) Applicant: MAN Truck & Bus AG, Munich (DE)

(72) Inventors: Christo Braykoff, Munich (DE);
Hansjörg Schultheiss, Munich (DE)

(73) Assignee: MAN Truck & Bus AG, München (DE)

( * ) Notice: Subject to any disclaimer, the term of this patent is extended or adjusted under 35 U.S.C. 154(b) by 260 days.

(21) Appl. No.: 16/195,232

(22) Filed: Nov. 19, 2018

(65) Prior Publication Data
US 2019/0152315 A1 May 23, 2019

(30) Foreign Application Priority Data

Nov. 22, 2017 (DE) .................. 10 2017 127 583

(51) Int. Cl.
*B60K 17/36* (2006.01)

(52) U.S. Cl.
CPC ........... *B60K 17/36* (2013.01); *B60Y 2200/14* (2013.01)

(58) Field of Classification Search
CPC ........ B60K 17/36; B60K 17/344–3467; B60K 17/354
See application file for complete search history.

(56) References Cited

U.S. PATENT DOCUMENTS

| | | | | |
|---|---|---|---|---|
| 2,407,675 A | * | 9/1946 | Morgan | B60K 17/344 475/198 |
| 2,870,854 A | * | 1/1959 | Keese | B60K 17/36 180/24.09 |
| 2,889,717 A | | 6/1959 | Kelley | |
| 2,936,036 A | * | 5/1960 | Norelius | B60K 17/3467 180/247 |
| 7,824,289 B2 | * | 11/2010 | Gleasnnan | B62D 11/18 475/18 |

FOREIGN PATENT DOCUMENTS

| | | |
|---|---|---|
| DE | 196 45 898 C1 | 1/1998 |
| DE | 10 2005 002 858 B4 | 2/2008 |
| DE | 102010052278 A1 | 5/2011 |
| DE | 102010034225 A1 | 2/2012 |
| DE | 10 2010 040 883 A1 | 3/2012 |
| EP | 3 045 339 A1 | 7/2016 |
| JP | H08337125 A | 12/1996 |

OTHER PUBLICATIONS

European Search Report in related case No. EP 18201661.6, dated May 7, 2019.
German Search Report in related case DE 10 2017 127 583.5, dated Jun. 29, 2018.

* cited by examiner

*Primary Examiner* — Erin D Bishop
(74) *Attorney, Agent, or Firm* — Maginot, Moore & Beck LLP

(57) ABSTRACT

An axle drive system for a motor vehicle, in particular a commercial vehicle, has a drive unit. The axle drive apparatus also has a first drive axle for drive-connecting to the drive unit. The first drive axle has a first intermediate gear stage and a first bevel gear stage. The axle drive system also has a second drive axle which is drive-connected to the first drive axle. A transmission ratio of the first intermediate gear stage is not equal to 1. A transmission ratio of the first drive axle, in particular a common transmission ratio of the first intermediate gear stage and the first bevel gear stage, corresponds to a transmission ratio of the second drive axle.

20 Claims, 2 Drawing Sheets

AXLE DRIVE SYSTEM

Figure 1:
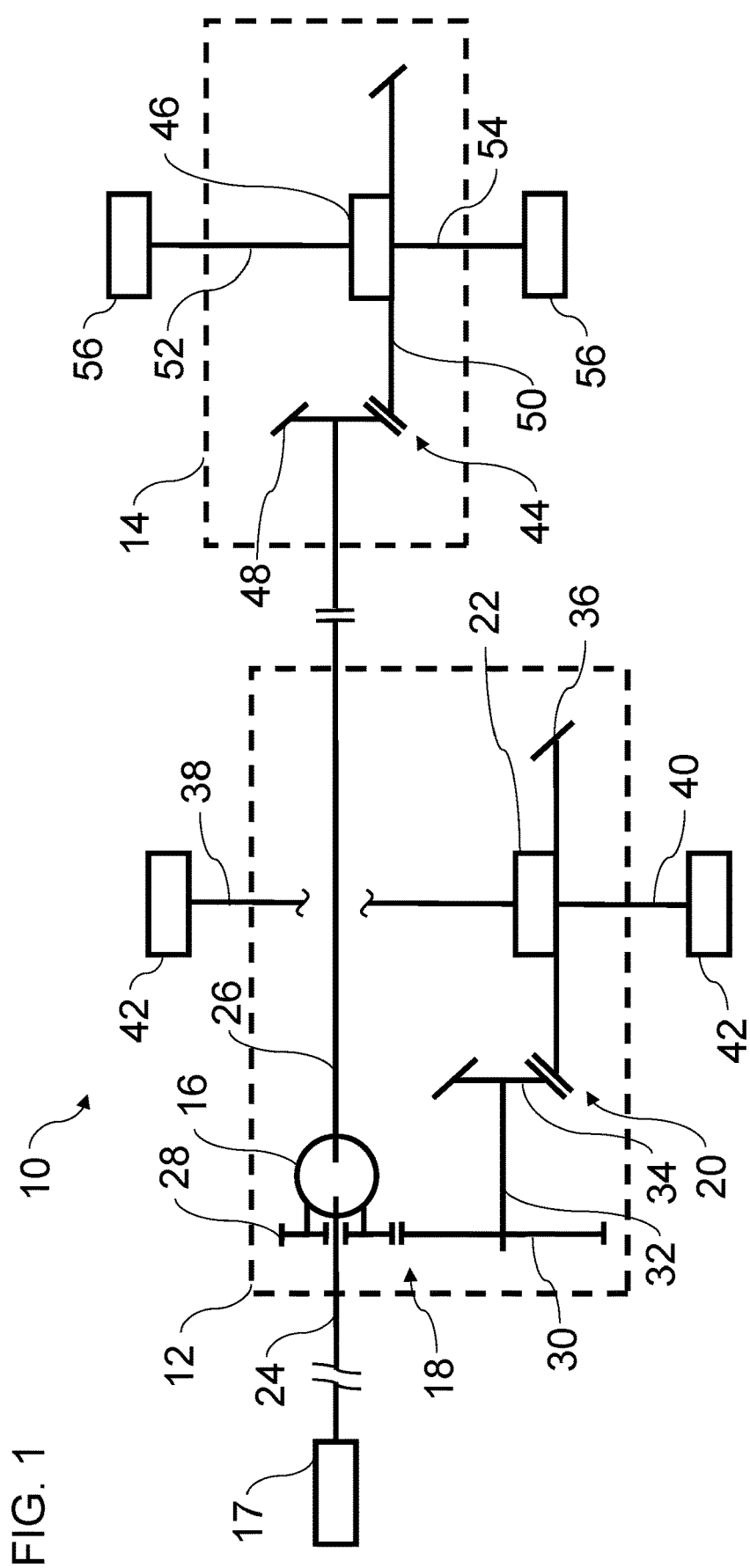

The invention relates to an axle drive apparatus for a motor vehicle, in particular a commercial vehicle.

In the case of vehicles with more than one driven rear or front axle, what is known as a through-connected drive can be used. In comparison with a simple axle drive, such as, for example, in a solo axle, the said drive can additionally have a longitudinal differential and a spur gear stage, in order to produce the required power split. In this way, no differential rotational speeds are produced in the longitudinal differential while driving straight ahead, and the spur gear stage in the through-connected drive is typically configured with a transmission ratio of i=1.0.

One example for a plurality of driven front or rear axles is an axle tandem. An axle tandem has two drive axles. Here, a first drive axle is configured as a through-connected drive axle which is driven by a drive unit, for example an internal combustion engine, and at the same time drives a second drive axle.

DE 10 2005 002 858 B4 discloses a tandem axle arrangement. One axle of the tandem axle arrangement has intermediate gears which mesh with one another. The intermediate gears have identical diameters and tooth numbers, with the result that there is a 1:1 transmission ratio. In this way, both axles of the tandem axle arrangement can have transverse differentials, bevel pinions and ring gears which correspond to one another, and a through-connected drive shaft can be drive-coupled directly via an articulated shaft to the bevel pinion of the second axle.

Here, however, a transmission ratio of i=1.0 of the intermediate gears can entail acoustic disadvantages and load-bearing capability disadvantages. In addition, there can be disadvantages in the case of the installation space on account of identical tip circle diameters of the two intermediate gears.

EP 3 045 339 A1 discloses a tandem drive axle assembly. A front rear axle has an input shaft which rotates about a first rotational axis and a bevel pinion which rotates about a second rotational axis. The input shaft and the bevel pinion are connected via a spur gear pair, the spur gears having a different number of teeth. An intermediate axle differential gear for absorbing the rotational speed differences is provided between the front rear axle and a rear rear axle of the tandem drive axle assembly.

Here, a transmission ratio of the intermediate gear stage of i≠1.0 can lead to an undesired permanent rotational speed difference in the longitudinal differential. Driving with an engaged longitudinal lock is not possible in the case of an unequal transmission ratio of the through-connected axle and the solo axle.

The invention is based on the object of providing an alternative or improved axle drive system, by way of which disadvantages in the prior art can be overcome. In particular, the axle drive system is to have improved acoustic properties, an improved load-bearing capability and/or an improved installation space utilization.

The object is achieved by way of an axle drive system according to the independent claim. Advantageous developments are specified in the dependent claims and the description.

The axle drive system is suitable for a motor vehicle, in particular a commercial vehicle, having a drive unit. The axle drive system has a first drive axle (first axle drive) for drive-connecting to the drive unit. The first drive axle has an intermediate gear stage with an intermediate pinion and an intermediate gear, and a first bevel gear stage with a bevel pinion and a ring gear. The axle drive system has a second drive axle which is drive-connected to the first drive axle and has a second bevel gear stage with a bevel pinion and a ring gear. A transmission ratio of the intermediate gear stage is not equal to 1. An overall transmission ratio of the first drive axle corresponds to an overall transmission ratio of the second drive axle. A number of teeth of the intermediate gear of the intermediate gear stage corresponds to a number of teeth of the ring gear of the second bevel gear stage, a number of teeth of the bevel pinion of the first bevel gear stage corresponds to a number of teeth of the bevel pinion of the second bevel gear stage, and/or a number of teeth of the intermediate pinion of the intermediate gear stage corresponds to a number of teeth of the ring gear of the first bevel gear stage.

In the present case, the term "transmission ratio" can be understood to mean, in particular, the ratio of the numbers of teeth between the driven gearwheel and the driving gearwheel ($n_{teeth\_output}/n_{teeth\_drive}$). An overall transmission ratio results, for example, as the product of respective individual transmission ratios between gearwheel pairings.

In particular, the first intermediate gear is connected in a driving manner to the first bevel gear stage and/or the first drive axle is connected in a driving manner to the second drive axle.

The transmission ratio of the first intermediate gear stage which does not equal 1 leads to unequal numbers of teeth of an intermediate pinion and an intermediate gear of the intermediate gear stage. This is advantageous for acoustic reasons and load-bearing capability reasons. It is ensured on the basis of the unequal number of teeth that the same teeth of the intermediate pinion and of the intermediate gear do not always mesh with one another. If, for example, one tooth of the intermediate pinion has production-induced deviations which lead to undesired excess stress and/or pressure on the relevant teeth of the intermediate pinion and on the respective teeth of the intermediate gear which mesh with the relevant teeth of the intermediate pinion, the damaging effect of the excess stress and/or pressure is distributed to a plurality of teeth of the intermediate gear. In other words, a situation is prevented in which the same tooth of the intermediate gear is always damaged by way of the faulty tooth of the intermediate pinion, and vice versa. This increases the load-bearing capability over the service life and leads to lower acoustic emissions during operation.

In addition, the tip circle diameters of the two gearwheels of the intermediate gear stage and thus the package can be influenced in a targeted manner, in order, for example, to utilize the installation space in an improved manner.

If a transmission ratio of the first drive axle to the wheels of the first drive axle corresponds to a transmission ratio of the second drive axle to the wheels of the second drive axle, an (undesired and permanent) rotational speed difference in the longitudinal differential of the first axle drive does not occur. The longitudinal differential is as a rule not designed for a permanent rotational speed compensation which is brought about by way of a rotational speed difference between the first and the second drive axle. A permanent rotational speed difference can therefore lead to a reduction of the service life of the longitudinal differential.

In addition, an advantageous design approach for the numbers of teeth of the intermediate gear stage, the first bevel gear stage and the second bevel gear stage is proposed, in the case of which design approach an overall transmission ratio of the intermediate gear stage and the first bevel gear stage corresponds to a transmission ratio of the second bevel gear stage.

In one particularly preferred embodiment, a number of teeth of the intermediate pinion of the intermediate gear stage and a number of teeth of the intermediate gear of the intermediate gear stage do not have an integral common factor of greater than 1.0. This has the advantage that all the teeth of the intermediate pinion mesh with all the teeth of the intermediate gear, with the result that damage which is brought about, for example, by way of faulty teeth of the intermediate pinion can be distributed (uniformly) to all the teeth of the intermediate gear.

In a further embodiment, the intermediate pinion of the intermediate gear stage drives the intermediate gear of the intermediate gear stage.

In a further embodiment, the transmission ratio of the intermediate gear stage is greater than 1.

In one embodiment, the intermediate gear stage is configured as a spur gear stage.

In a further embodiment, the first drive axle is configured as a through-connected drive axle.

In one exemplary embodiment, the second drive axle is configured as a solo drive axle. A solo drive axle serves merely to drive the wheels which are connected directly to the drive axle. A transfer (a through-connected drive) to a further drive axle is not provided.

In one development, the overall transmission ratio of the intermediate gear stage and the first bevel gear stage corresponds to a transmission ratio of the second bevel gear stage.

In one design variant, the axle drive system is configured as a tandem axle, in particular of a commercial vehicle.

As an alternative, the axle drive system can have at least one further drive axle. In this way, an axle drive system with three or more driven axles (axle drives) can also utilize the present invention.

In a further embodiment, the at least one further drive axle is arranged between the first drive axle and the second drive axle, and/or the overall transmission ratio of the first drive axle corresponds to an overall transmission ratio of the at least one further drive axle.

In one development, the at least one further drive axle has a further intermediate gear stage and a further bevel gear stage. The overall transmission ratio of the first intermediate gear stage and the first bevel gear stage corresponds to an overall transmission ratio of the further intermediate gear stage and the further bevel gear stage. In this way, the intermediate gear stages and the bevel gear stages of the two through-connected drive axles can be configured as identical parts/can be identical. In addition, the intermediate gear stages profit from the transmission ratios which do not equal 1, with the result that the above-specified advantages with regard to the acoustics and the load-bearing capability can be achieved for the first drive axle and the second drive axle.

In particular, a transmission ratio of the first intermediate gear stage can correspond to a transmission ratio of the second intermediate gear stage. In addition, a transmission ratio of the first bevel gear stage can correspond to a transmission ratio of the second bevel gear stage.

In one exemplary embodiment, the first drive axle has an input shaft for drive-connecting to the drive unit. As an alternative or in addition, the first drive axle has a through shaft for drive-connecting to the second drive axle. As an alternative or in addition, the first drive axle has a longitudinal differential which is preferably provided in drive terms between the input shaft on one side and the through shaft and the intermediate gear stage on the other side.

In addition, the first drive axle, the second drive axle and/or each further drive axle (if present) can in each case have a transverse differential and wheels. The bevel gear stage of the respective drive axle can be connected in a driving manner to the transverse differential which can in turn be connected in a driving manner via wheel shafts to the wheels.

In particular, the first bevel gear stage and/or the second bevel gear stage (if present) can have spur toothed, helically toothed, double helically toothed, spirally toothed (spiral or hypoid) bevel gears or else gearwheels which are configured in accordance with another toothing type as desired.

The intermediate gear stage can preferably have spur toothed, helically toothed, double helically toothed gearwheels or else gearwheels which are configured in accordance with another toothing type as desired.

The invention also relates to a motor vehicle, in particular a commercial vehicle (for example, an omnibus or a lorry), having an axle drive system as disclosed herein.

Figure 2:
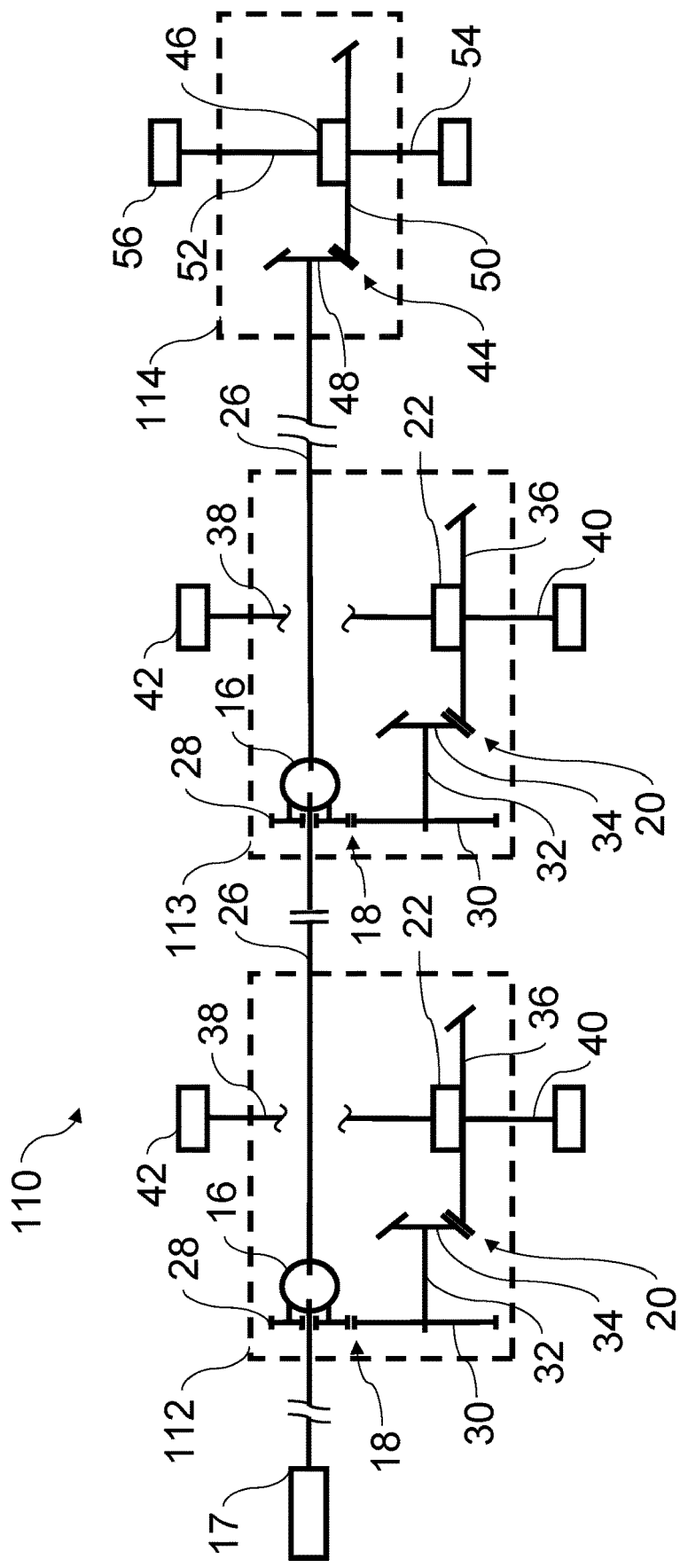

The above-described preferred embodiments and features of the invention can be combined with one another in any desired manner. Further details and advantages of the invention will be described in the following text with reference to the appended drawings, in which:

FIG. 1 shows an outline sketch of an exemplary axle drive system in accordance with the present disclosure, and FIG. 2 shows an outline sketch of a further exemplary axle drive system in accordance with the present disclosure.

The embodiments which are shown in the figures correspond to one another at least partially, with the result that similar or identical parts are provided with the same reference numerals, and reference is also made, in order to describe them, to the description of the other embodiments and/or figures, in order to avoid repetitions.

FIG. 1 shows an axle drive system 10. The axle drive system 10 can be included in a motor vehicle, in particular in a commercial vehicle. For example, the axle drive system 10 can be used as a tandem axle drive apparatus of a lorry or an omnibus. The axle drive system 10 has a first drive axle (a first axle drive) 12 and a second drive axle (a second axle drive) 14.

The first drive axle 12 has a longitudinal differential 16, an intermediate gear stage 18, a first bevel gear stage 20 and a first transverse differential 22.

A drive unit 17, for example an electric motor or an internal combustion engine, is connected in a driving manner to an input shaft 24 of the first drive axle 12. The input shaft 24 is connected in a driving manner to the longitudinal differential 16. The input shaft 24 extends in a vehicle longitudinal direction.

The first drive axle 12 is configured as a through-connected axle drive. In order to function as a through-connected drive, the first drive axle 12 has the longitudinal differential 16 and a through-connected drive shaft 26. The longitudinal differential 16 distributes the drive power to the intermediate gear stage 18 and the through-connected drive shaft 26. The through-connected drive shaft 26 is connected in a driving manner via a clutch to an input shaft of the second drive axle 14. The through-connected drive shaft 26 extends in a vehicle longitudinal direction.

An axle drive system without a longitudinal differential is also conceivable. The first drive axle can then be connected via a shaft to the second drive axle. That is to say, no rotational speed compensation between the two axles is possible in a conventional way via a longitudinal differential. The importance of the invention is particularly high in the case of a configuration of this type.

The first drive axle 12 can additionally have a switching element (not shown) which acts as a lock (longitudinal differential lock). The switching element can establish a direct drive connection between the input shaft 24 and the intermediate gear stage 18. The switching element can be configured, for example, as a claw coupling.

The intermediate gear stage 18 is configured as a spur gear stage. The intermediate gear stage 18 has an intermediate pinion 28 and an intermediate gear 30. The intermediate pinion 28 is driven by the longitudinal differential 16. In the case of a differential rotational speed between the intermediate pinion 28 and the through-connected drive shaft 26 of Δn=0 (and also in the case of Δn≠0), the introduced torque is divided equally during normal operation to the intermediate pinion 28 and the through-connected drive shaft 26. The intermediate pinion 28 meshes with the intermediate gear 30. The intermediate gear 30 is connected in a driving manner via an intermediate shaft 32 to the first bevel gear stage 20. The intermediate shaft 32 is arranged parallel to the input shaft 24 and the through-connected drive shaft 26.

The first bevel gear stage 20 has a first bevel pinion 34 and a first ring gear 36. The first bevel pinion 34 meshes with the first ring gear 36. The first bevel gear stage 20 redirects the power which is provided by the intermediate shaft 32 by approximately 90° via the first transverse differential 22 to wheel shafts 38 and 40. In some embodiments, the intermediate shaft 32 and the first bevel pinion 34 of the bevel gear stage 20 can be configured as an integral unit in the form of a bevel pinion shaft. The first bevel gear stage 20 can have, for example, spur toothed, helically toothed or spirally toothed (spiral or hypoid) bevel gears. The wheel shafts 38 and 40 drive wheels 42 of the motor vehicle.

The second drive axle 14 has a second bevel gear stage 44 and a second transverse differential 46. The second drive axle 14 is configured as a solo drive axle. In other words, the second drive axle 14 transmits the received torque merely to the wheels 56 which are attached to the second drive axle 14.

The second bevel gear stage 44 has a second bevel pinion 48 and a second ring gear 50. The through-connected drive shaft 26 is connected in a driving manner to the second bevel pinion 48. The second bevel pinion 48 meshes with the second ring gear 50. The second bevel gear stage 44 redirects the power which is provided by the through-connected drive shaft 26 by approximately 90° via the second transverse differential 46 to wheel shafts 52 and 54. The second bevel gear stage 44 can have, for example, spur toothed, helically toothed or spirally toothed (spiral or hypoid) bevel gears. The wheel shafts 52 and 54 drive the wheels 56 of the motor vehicle.

In accordance with the present disclosure, a design approach for the transmission ratios of the first drive axle 12 and the second drive axle 14 is proposed. The design approach provides acoustic advantages and load-bearing capability advantages in comparison with conventional approaches. In the case of a transmission ratio of the intermediate gear stage 18 which does not equal 1, the tip circle diameters of the two gearwheels of the intermediate gear stage 18 and therefore the package can additionally be influenced in a targeted manner, in order, for example, to utilize the installation space in an improved manner.

It is proposed to provide the intermediate gear stage 18, that is to say the spur gear stage of the first drive axle 12, with a transmission ratio of $i_{intermediate} \neq 1.0$. At the same time, the transmission ratios of the first bevel gear stage 20 and the second bevel gear stage 44 are configured in such a way that an overall transmission ratio of the intermediate gear stage 18 and the first bevel gear stage 20 corresponds to a transmission ratio of the second bevel gear stage 44. As a result, no undesired permanent rotational speed difference occurs in the longitudinal differential 16.

The design approach which is proposed by way of example comprises the following ratios and relationships of the numbers of teeth of the first axle drive 12 and the second axle drive 14.

$$teeth_{intermediate\_pinion(28)} \neq teeth_{intermediate\_gear(30)} \quad (1)$$

That is to say, the number of teeth of the intermediate pinion 28 of the intermediate gear stage 18 does not equal the number of teeth of the intermediate gear 30 of the intermediate gear stage 18.

$$teeth_{intermediate\_pinion(28)} = teeth_{first\_ring\_gear(36)} \quad (2)$$

That is to say, the number of teeth of the intermediate pinion 28 of the intermediate gear stage 18 is equal to the number of teeth of the first ring gear 36 of the first bevel gear stage 20.

$$teeth_{intermediate\_gear(30)} = teeth_{second\_ring\_gear(50)} \quad (3)$$

That is to say, the number of teeth of the intermediate gear 30 of the intermediate gear stage 18 is equal to the number of teeth of the second ring gear 50 of the second bevel gear stage 44.

$$teeth_{second\_bevel\_pinion(48)} = teeth_{first\_bevel\_pinion(34)} \quad (4)$$

That is to say, the number of teeth of the second bevel pinion 48 of the second bevel gear stage 44 is equal to the number of teeth of the first bevel pinion 34 of the first bevel gear stage 20.

In this way, the drive axles 12 and 14 have the same transmission ratios, the intermediate gear stage 18 of the first drive axle 12 having a transmission ratio which does not equal 1.

By way of example, the following configuration can be selected. The intermediate pinion 28 can have 38 teeth ($teeth_{intermediate\_pinion(28)}=38$). The intermediate gear 30 can have 37 teeth ($teeth_{intermediate\_gear(30)}=37$). The first bevel pinion 34 can have 13 teeth ($teeth_{first\_bevel\_pinion(34)}=13$). The first ring gear can have 38 teeth ($teeth_{first\_ring\_gear(36)}=38$). The second bevel pinion 48 can have 13 teeth ($teeth_{second\_bevel\_pinion(48)}=13$). The second ring gear 50 can have 37 teeth ($teeth_{second\_ring\_gear(50)}=37$).

The design approach makes it possible that the same teeth of the intermediate pinion 28 and the intermediate gear 30 do not always mesh with one another in the intermediate gear stage 18. If, in addition, the number of teeth of the intermediate pinion 28 and the number of teeth of the intermediate gear 30 do not have an integral common factor of greater than 1, each tooth of the intermediate pinion 28 meshes with each tooth of the intermediate gear 30.

If, in contrast, the intermediate pinion and the intermediate gear of the intermediate gear stage had the same number of teeth (as is conventional), acoustic disadvantages and load-bearing capability disadvantages might occur. If, for example, inaccuracies which led to pitch deviations occurred during the manufacture of the intermediate pinion or the intermediate gear, the resulting increased loads would always affect the same teeth of the intermediate pinion and the intermediate gear which meshed with one another. This can lead over the service life of the axle drive system to increased wear and can be audible (and perceived as disruptive).

The design approach which is proposed here in can be applied to axle drive systems with as many driven axles as desired. By way of example, FIG. 2 shows an axle drive system 110 with three drive axles. The three drive axles have two through-connected drive axles and one solo drive axle.

It is also possible, however, to provide additional through-connected drive axles in order to increase the number of drive axles.

The axle drive system 110 has a first drive axle 112, a second drive axle 113 and a third drive axle 114.

The first drive axle (first axle drive) 112 and the second drive axle (second axle drive) 113 of the axle drive system 110 are configured as through-connected drive axles. In particular, the drive axles 112 and 113 of the axle drive system 110 can be configured in the same way as the first drive axle 12 of the axle drive system 10 from FIG. 1, as is indicated by way of the same components with the same reference numerals in FIG. 2. The first drive axle 112 is connected in a driving manner to the second drive axle 113. The second drive axle 113 is connected in a driving manner to the third drive axle 114.

The third drive axle 114 is configured as a solo drive axle. In particular, the third drive axle 114 of the axle drive system 110 can be configured in the same way as the second drive axle 14 of the axle drive system 10 from FIG. 1, as is likewise indicated by way of the same components with the same reference numerals in FIG. 2.

The overall transmission ratios of the drive axles 112, 113 and 114 are identical. The transmission ratio of the intermediate gear stage 18 of the first drive axle 112 corresponds to a transmission ratio of the intermediate gear stage 18 of the second drive axle 113. The transmission ratio of the bevel gear stage 20 of the first drive axle 112 corresponds to a transmission ratio of the bevel gear stage 20 of the second drive axle 113. The overall transmission ratio of the intermediate gear stage 18 and the bevel gear stage 20 of the first drive axle 112 and the overall transmission ratio of the intermediate gear stage 18 and the bevel gear stage 20 of the second drive axle 113 correspond to a transmission ratio of the bevel gear stage 44 of the third drive axle 114.

The invention is not restricted to the above-described preferred exemplary embodiments. Rather, a multiplicity of variants and modifications are possible which likewise utilize the concept of the invention and therefore fall within the scope of protection. In particular, the invention also claims protection for the subject matter and the features of the subclaims independently of the claims to which they refer. In particular, all the features of independent Claim 1 are disclosed independently of one another. In addition, the features of the subclaims are also independent of all the features of independent Claim 1 and are disclosed, for example, independently of a presence and/or a configuration of the first drive axle, the intermediate gear stage, the first bevel gear stage, the second drive axle and the second bevel gear stage of independent Claim 1.

LIST OF REFERENCE NUMERALS

10 Axle drive system
12 First drive axle (first axle drive)
14 Second drive axle (second axle drive)
16 Longitudinal differential
17 Drive unit
18 Intermediate gear stage
20 First bevel gear stage
22 First transverse differential
24 Input shaft
26 Through-connected drive shaft
28 Intermediate pinion
30 Intermediate gear
32 Intermediate shaft (bevel pinion shaft)
34 First bevel pinion
36 First ring gear
38 Wheel shaft
40 Wheel shaft
42 Wheel
44 Second bevel gear stage
46 Second transverse differential
48 Second bevel pinion
50 Second ring gear
52 Wheel shaft
54 Wheel shaft
56 Wheel
110 Axle drive apparatus
112 First drive axle (first axle drive)
113 Second drive axle (second axle drive)
114 Third drive axle (third axle drive)

The invention claimed is:

1. An axle drive system for a motor vehicle, in particular a commercial vehicle, with a drive unit, comprising:
    a first drive axle which is drive-connected to the drive unit, the first drive axle having an intermediate gear stage with an intermediate pinion and an intermediate gear, and a first bevel gear stage with a bevel pinion and a ring gear; and
    a second drive axle which is drive-connected to the first drive axle and has a second bevel gear stage with a bevel pinion and a ring gear,
    a transmission ratio of the intermediate gear stage not being equal to 1;
    an overall transmission ratio of the first drive axle corresponding to an overall transmission ratio of the second drive axle; and
    wherein at least one of the following,
        a number of teeth of the intermediate gear of the intermediate gear stage corresponds to a number of teeth of the ring gear of the second bevel gear stage,
        a number of teeth of the bevel pinion of the first bevel gear stage corresponds to a number of teeth of the bevel pinion of the second bevel gear stage, and/or
        a number of teeth of the intermediate pinion of the intermediate gear stage corresponds to a number of teeth of the ring gear of the first bevel gear stage.

2. The axle drive system according to claim 1, wherein: the number of teeth of the intermediate pinion of the intermediate gear stage and the number of teeth of the intermediate gear of the intermediate gear stage do not have an integral common factor of greater than 1.0.

3. The axle drive system according to claim 1, wherein: the intermediate pinion of the intermediate gear stage drives the intermediate gear of the intermediate gear stage.

4. The axle drive system according to claim 3, wherein: the transmission ratio of the intermediate gear stage is greater than 1.

5. The axle drive system according to claim 1, wherein: the transmission ratio of the intermediate gear stage is greater than 1.

6. The axle drive system according to claim 1, wherein: the intermediate gear stage is configured as a spur gear stage.

7. The axle drive system according to claim 1, wherein: the first drive axle is configured as a through-connected drive axle.

8. The axle drive system according to claim 1, wherein: the second drive axle is configured as a solo drive axle.

9. The axle drive system according to claim 1, wherein:
an overall transmission ratio of the intermediate gear stage and the first bevel gear stage corresponds to a transmission ratio of the second bevel gear stage.

10. The axle drive system according to claim 1, wherein the axle drive system is configured as a tandem axle drive system.

11. The axle drive system according to claim 1, further comprising:
at least one further drive axle configured as a through-connected drive axle.

12. The axle drive system according to claim 11, wherein:
the at least one further drive axle is arranged between the first drive axle and the second drive axle.

13. The axle drive system according to claim 11, wherein:
the overall transmission ratio of the first drive axle corresponding to an overall transmission ratio of the at least one further drive axle.

14. The axle drive system according to claim 11, wherein:
the at least one further drive axle includes a further intermediate gear stage and a further bevel gear stage; and
an overall transmission ratio of the intermediate gear stage and the first bevel gear stage corresponds to an overall transmission ratio of the further intermediate gear stage and the further bevel gear stage.

15. The axle drive system according to claim 11, wherein the first drive axle comprises:
an input shaft which is drive-connected to the drive unit; and/or
a through shaft which is drive-connected to the second drive axle; and/or
a longitudinal differential which is provided in drive terms between the input shaft on one side and the through shaft and the intermediate gear stage on another side.

16. The axle drive system according to claim 1, wherein the first drive axle comprises:
an input shaft which is drive-connected to the drive unit; and/or
a through shaft which is drive-connected to the second drive axle; and/or
a longitudinal differential which is provided in drive terms between the input shaft on one side and the through shaft and the intermediate gear stage on another side.

17. A motor vehicle, in particular a commercial vehicle, having an axle drive system, the axle drive system comprising:
a first drive axle which is drive-connected to the drive unit, the first drive axle having an intermediate gear stage with an intermediate pinion and an intermediate gear, and a first bevel gear stage with a bevel pinion and a ring gear; and
a second drive axle which is drive-connected to the first drive axle and has a second bevel gear stage with a bevel pinion and a ring gear:
a transmission ratio of the intermediate gear stage not being equal to 1;
an overall transmission ratio of the first drive axle corresponding to an overall transmission ratio of the second drive axle; and
wherein at least one of the following,
a number of teeth of the intermediate gear of the intermediate gear stage corresponding to a number of teeth of the ring gear of the second bevel gear stage,
a number of teeth of the bevel pinion of the first bevel gear stage corresponding to a number of teeth of the bevel pinion of the second bevel gear stage, and/or
a number of teeth of the intermediate pinion of the intermediate gear stage corresponding to a number of teeth of the ring gear of the first bevel gear stage.

18. The motor vehicle according to claim 17, wherein:
the number of teeth of the intermediate pinion of the intermediate gear stage and the number of teeth of the intermediate gear of the intermediate gear stage do not have an integral common factor of greater than 1.0.

19. The motor vehicle according to claim 17, wherein:
the intermediate pinion of the intermediate gear stage drives the intermediate gear of the intermediate gear stage.

20. The motor vehicle according to claim 17, wherein:
the transmission ratio of the intermediate gear stage is greater than 1.

* * * * *